Figure 1:
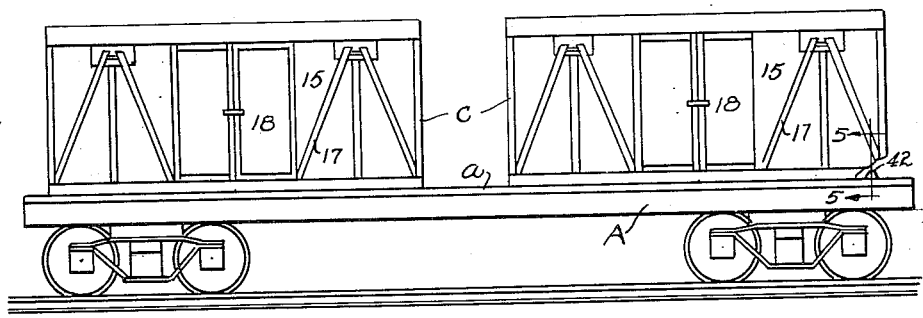

Aug. 12, 1930.  B. F. FITCH  1,772,939
APPARATUS FOR TRANSPORTING FREIGHT
Filed Aug. 31, 1928  2 Sheets-Sheet 1

Inventor
Benjamin F. Fitch,
By Bates, Macklin, Gobrick & Tear
Attorneys

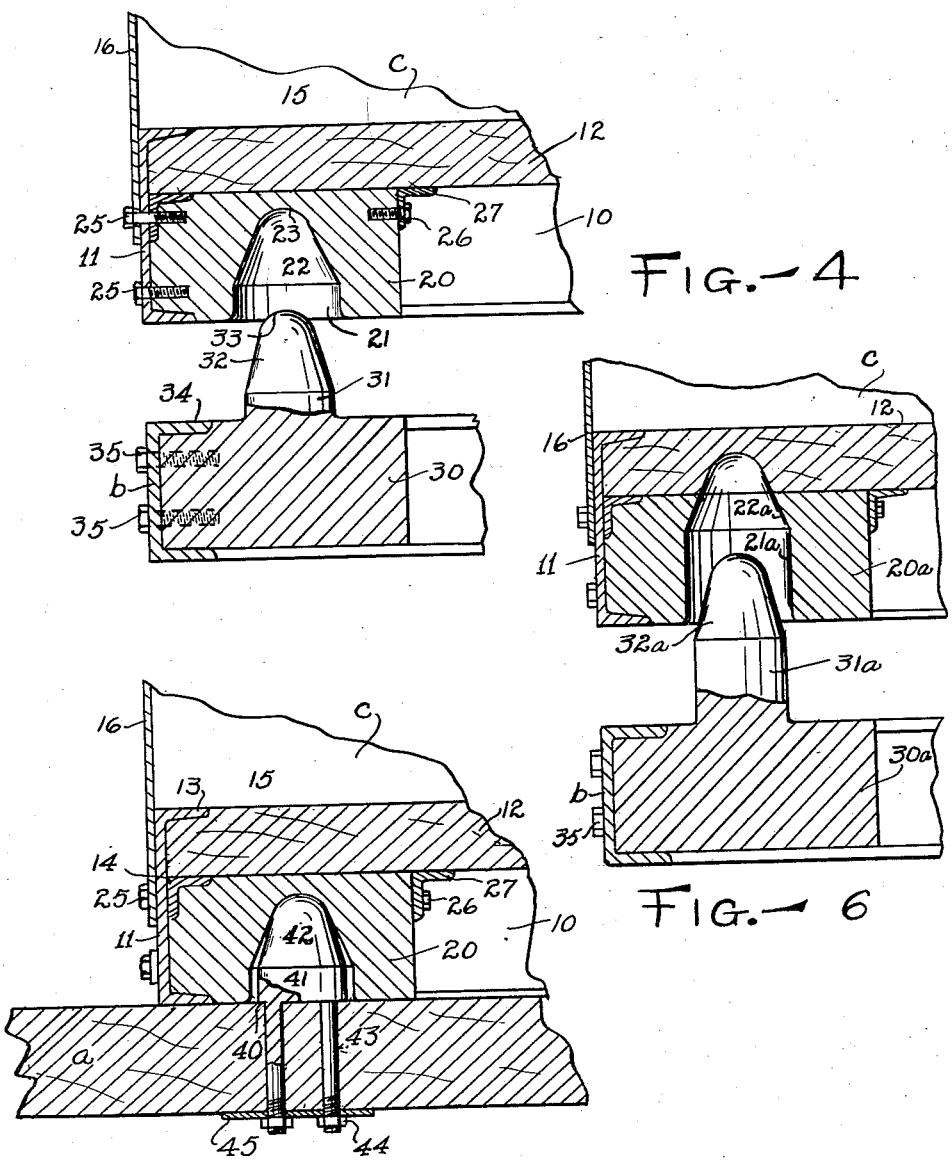

Patented Aug. 12, 1930

1,772,939

UNITED STATES PATENT OFFICE

BENJAMIN F. FITCH, OF GREENWICH, CONNECTICUT, ASSIGNOR TO MOTOR TERMINALS COMPANY, OF WILMINGTON, DELAWARE, A CORPORATION OF DELAWARE

APPARATUS FOR TRANSPORTING FREIGHT

Application filed August 31, 1928. Serial No. 303,305.

This invention relates to means for positioning removable containers on vehicles adapted to transport them. Heretofore, it has been customary to position the container by means on the vehicle engaging the exterior of the container corners. This requires the container to be of materially less width than the overall width of the vehicle, as for instance, an automobile truck. Now, the maximum width of truck or load which may travel on highways is limited by law in most States with the result that such externally engaged container must be narrower than the allowable maximum. It is the object of my invention to provide positioning devices carried by the vehicle and adapted to coact with devices mounted within the base frame of the container, whereby a container may be employed having the full width of the vehicle.
In endeavoring to lower as much as practicable the center of gravity of a load carried by a truck, I have heretofore devised trucks having their rear wheels projecting above the top plane of the truck frame and have arranged the container so that its floor proper is carried in registration with the top of the side and end sills of the container, and thus the remaining space beneath such floor proper and bounded by the sills is available for the projection of the wheels when the sills of the container rest on the truck frame. I now propose to avail myself of some of this idle space, bounded by the container sills and beneath the floor, for the mounting of the container member of my cooperative positioning unit.

The positioning unit comprises a pair of male and female members, and I prefer to mount the male members on the truck or vehicle and the female members on the container adjacent the corners thereof in the angle where the side and end sills join and beneath the floor proper. The female member may thus be very rigidly mounted in place in an idle space in the base of the container and will not project below the side sills of the container, whereby the latter may stand on an ordinary floor. The cooperating male member may be conveniently mounted in the angle between the side and end sills of the truck frame.

As it is desirable also to mount the same containers at will on flat cars, I so form the female member in the container that it may coact equally well with a male positioning member carried in the corner of the truck frame as explained, or with a male positioning member secured on top of the floor of the flat car. In the latter case I prefer to provide such male member with studs which extend downwardly through holes in the floor and have nuts at their lower ends for locking the member in place.

My invention is illustrated in the drawings hereof and hereinafter more fully explained, and the essential novel characteristics summarized in the claims.

Figure 2:
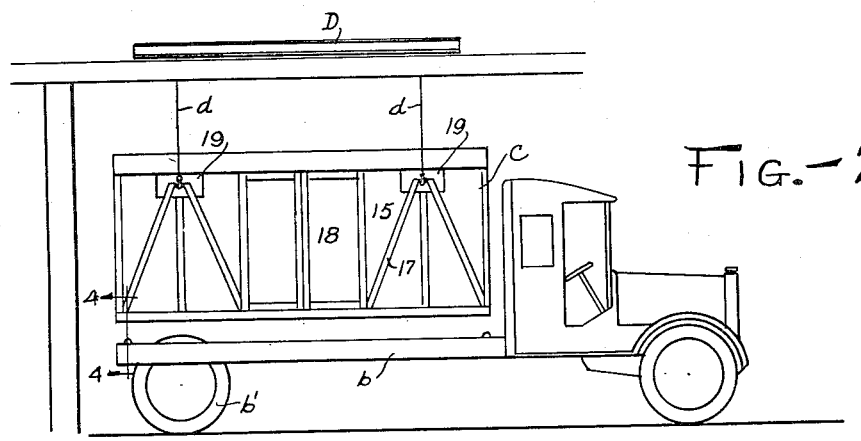
Figure 3:
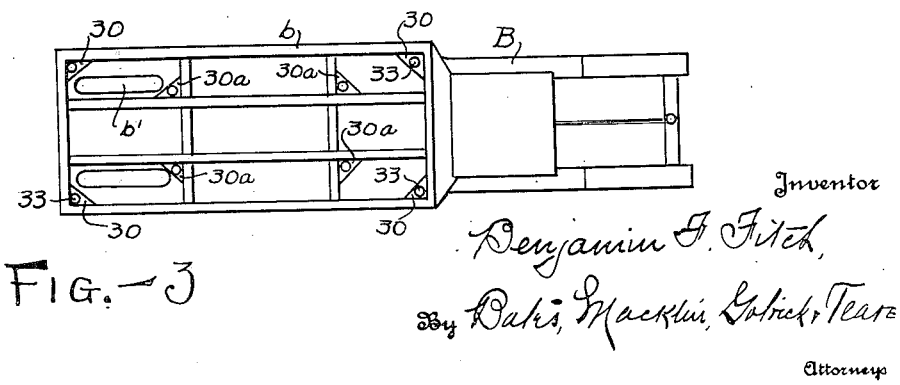

In the drawings Fig. 1 is a side elevation of a railway flat car carrying two containers, such members being equipped with my positioning devices; Fig. 2 is a side elevation of a truck and container together with a suitable hoisting apparatus suspending the container as it is being removed from or placed on a truck; Fig. 3 is a plan of the truck itself; Fig. 4 is an enlarged vertical section through the two members of the positioning device on the container and truck, as indicated by the line 4—4 on Fig. 2; Fig. 5 is a similar view of the positioning members on the container and flat car, as indicated by the line 5—5 on Fig. 1; Fig. 6 is a view similar to Fig. 4 illustrating a modification of the positioning device where greater vertical height of engaging surfaces is desired.

In Fig. 1, A indicates an ordinary railway flat car. In Figs. 2 and 3, B indicates an automobile truck having a horizontal rearwardly extending frame $b$ and having rear wheels $b^1$ which extend upwardly through openings in the frame some distance above it as shown in Fig. 2. C indicates the container shown in Figs. 1 and 2.

As indicated in Figs. 4 and 5, the container C has side sills 10 and end sills 11 which are preferably inwardly facing channel members. The floor 12 of the container is made up of suitable members of materially less depth than the sills 10 and 11. These members may be wooden planks or they may be of metal or plastic material or composite. They are indicated in the drawings as wooden planks. The flooring is formed at its edges to engage beneath the inward flange of the sills as indicated at 13 in Figs. 4 and 5, and such flooring may be supported by angle bars 14 secured to the webs of the sills, as well as by cross bars, not shown.

The containers have suitable side and end walls 15 and 16, which, if desired, may be metal plates overlapping the sills and riveted or otherwise secured to them. Suitable side bracing 17 may be employed. Figs. 1 and 2 show also doors 18 in the side of the containers. These containers have near their upper ends suitable attaching devices indicated at 19 for the attachment of raising cables, two of which cables are indicated at $d$ in Fig. 2 leading downwardly from a suitable traveling crane indicated at D.

The female members of my positioning combination are preferably metal blocks 20, each of which has in it a cavity leading upward from the lower face. This cavity is of cylindrical form for a material distance as shown at 21 and then conical as at 22 preferably terminating in a dome 23. This block 20 may be secured in place by suitable cap screws, bolts or rivets. I have shown cap screws 25 passing through the side sill and a cap screw 26 passing through a transverse angle bar 27. The exterior of the block may be triangular, in which case, the angle bar 27 will extend diagonally, as for instance at 45° to the side and end sills, and secured at its ends to such sills. The block 20 may readily be a malleable casting.

The male members are somewhat differently constructed according to whether they are mounted on the truck or on the railway flat car. For the truck I prefer to employ a triangular block 30 integrally carrying the upwardly projecting member. This member has a cylindrical portion 31 of slightly less diameter than the cylindrical part 21 of the female member and then a conical portion 32 terminating in a dome 33.

The cylinder and cone portions of the male member may be integral with the block and the whole member may conveniently be a malleable casting. This member occupies the angle at the meeting of the side and end sills of the truck, and may have a recess 34 whereby it may project beneath the upper flange of the sills. The lower face of the block may readily rest on the lower flanges of the sills. The block may be secured in place by cap screws or bolts indicated at 35 extending through the webs of the sills. The blocks 30 are accordingly rigidly secured in idle spaces within the truck frame and serve to additionally brace that frame.

The male members for the flat car shown at 40 in Fig. 5 have their projections similar to those just described, but instead of a block carrying the cylindrical portion 41 and the corner portion 42, I prefer to provide integral downwardly extending studs 43 which may occupy openings in the flat car floor. To mount these members it is only necessary to bore holes through the floor of the flat car and pass the studs through them, after which nuts 44 are screwed onto the threaded end portions of the studs, preferably against a suitable plate 45. This enables ready placing of the device on an existing flat car or the ready removal of it, should it be desired to use the flat car for purposes where the upward projections might be inconvenient.

I have found it very convenient in making containers of large size to use channel shaped side sills and end sills 6" in height and to use flooring 2" in thickness, the top of the flooring being in a plane with the top of the sills. This leaves an available space of 4" beneath the floor, and in the construction as illustrated in Fig. 4 the block 20 mounted entirely within this space has its cavity of somewhat less than 4" in height, the corresponding projection being of the same dimensions. My experience indicates that such height of interlocking engagement is amply sufficient for ordinary usage.

Should it be desired to have a greater height of engagement than that provided by the proportions of Fig. 4, I may accomplish this without changing the container dimensions but employing such an interlocking construction as shown in Fig. 6. There the block 20$^a$ secured within the bounding of the sills and beneath the floor 12 of the container has the cavity extending clear through it and the available cavity is continued into a portion of the planking 12. This enables the wall 21$^a$ to be higher than the wall 21 of Fig. 4, the conical portion 22$^a$ being shown at the same angle as the conical portion 22. When the female member is constructed as just described, the male member is correspondingly extended, the cylindrical portion 31$^a$ of Fig. 6 being considerably higher than the corresponding portions 31 of Fig. 4. The conical portion 32$^a$ is shown as of the same proportions as the conical portion 32.

There is sufficient clearance between the projections of the male members and the cavities of the female members to allow the ready placement of the container even though the truck frame may be warped or otherwise out of true, due to road conditions, at the time the body is placed on it.

In addition to the corner positioning devices mentioned, I may if desired use intermediate positioners. Four male members of such intermediate pairs are indicated at 30$^a$ in Fig. 3, these members being secured to longitudinal and transverse truck beams in substantially the same manner as the corner members 30. Female members corresponding to these members 30ᵃ may be secured to longitudinal and cross floor beams in the base of the container.

The additional positioning devices are of an advantage when the truck does not stand strictly horizontal at the time the horizontal body is lowered onto it. In such case the highest corner of the truck will be first engaged by the body and then the adjacent intermediate positions will properly level the body without waiting for the corners of the opposite ends of the body to become engaged. These intermediate positioners also form a further interlock between the truck and body, holding the latter in place even if one end should be in some accidental operation be jarred clear of the truck member.

It will be seen that both the male and female members of my coacting positioning device may be very cheaply constructed and readily put in place; that when in place by reason of the conical form of the male member, it is not necessary to accurately place the container before it is lowered into engagement, but simply to have the entrance to the female member come somewhere over the cone, the cone acting as a cam to shift the container as it is lowered, then the cylindrical wall of the female member comes into snug engagement with the cylindrical portion of the male member, whereby the container is firmly held in its final position during the travel of the vehicle.

My interlocking members do not interfere in any way with the projection of the wheels above the truck frame into the space within the container sills beneath the floor. The female members do not project beneath the container sills, so that the latter may rest on those sills or elsewhere whenever deposited. The male members do not interfere with many other uses of the flat car and truck, but in case of such other use, may, if desired, be removed.

Reference is made to my copending application No. 391,081 filed September 7, 1929 for claims on the male positioning device per se.

I claim:—

1. The combination with a vehicle and a container, of interlocking positioning devices arranged in pairs and each comprising a male and a female member, one of said members being secured to the container beneath its floor between its floor sills, the other secured to the vehicle.

2. The combination with a vehicle, of a container adapted to rest thereon and having side sills and a floor, the floor being adjacent the top of the side sills and leaving a space beneath it bounded by the sills, and cooperative positioning devices carried by the vehicle and container, those on the container being located beneath the floor within the boundary of the sills.

3. A container having base sills and a floor, there being a space beneath the floor between the sills, and a block mounted in said space, combined with a vehicle having a block secured to its frame, one of said blocks having a projection and the other a coacting cavity.

4. A removable container for a vehicle comprising a base and side and end walls, the base having sills at the sides and its end, a floor of less depth than the sills, and blocks mounted in the corner spaced beneath the floor and secured to the side and end sills, said blocks having positioning means adapted to engage with cooperating means on the vehicle.

5. A removable container comprising a base and side and end walls, the base having sills at the sides and its ends, a floor of less depth than the sills and blocks mounted in the four corner spaces beneath the floor, said blocks having downwardly facing cavities adapted to cooperate with upwardly facing projections on a vehicle.

6. A container adapted for mounting on a vehicle and having a base bounded by sills of substantially 6" in depth and having a floor substantially 2" in depth flush with the top of the sills, and blocks of not over 4" in depth secured in the corner spaces beneath the floor and abutting the sills, each block having in it a downwardly facing cavity.

7. A container having base sills and a floor, there being a space beneath the floor bounded by the sills, and blocks mounted in said spaces adjacent the corner, each block having a downwardly facing cavity the lower portion of which is cylindrical and the upper portion of which is conical.

8. A container adapted for mounting on a vehicle and having a base bounded by sills of inwardly facing channel shape, a floor substantially flush with the top of the sills and of materially less depth, and blocks in the corner spaces beneath the floor and abutting the sills and projecting between their flanges, each block having in it a downwardly facing cavity, the lower portion of which is cylindrical and the upper portion of which is conical.

9. The combination with a railway flat car, of a positioning device resting on the floor of the car and having in its underside rigid threaded studs projecting through the floor, and nuts screwing onto said studs bearing against the underside of the floor.

10. The combination with a vehicle and a container, of interlocking positioning devices arranged in pairs, one member of the pair secured to the container and the other to the vehicle, four of the pairs being located adjacent the corners of the vehicle and others of the positioning pairs being located intermediately.

11. The combination with a vehicle and a container adapted to be removably mounted thereon, of cooperative positioning devices carried by the vehicle and the base of the container respectively, such devices on the container being all located within the outside boundary of the container, and comprising four devices adjacent the respective corners and one or more intermediately located device.

12. The combination with a vehicle and a container adapted to be removably mounted thereon, of cooperative positioning devices carried by the vehicle and the base of the container respectively, the devices carried by the vehicle being male members and the devices on the container being female members carried beneath the floor and within the outside boundary sills and not projecting below such sills, the cooperating pairs being located not only adjacent the corners, but also in intermediate positions lengthwise of the container floor and corresponding region of the truck.

13. The combination with a vehicle and a container adapted to be removably mounted thereon and provided with a horizontal floor, of cooperative positioning devices carried by the vehicle and the base of the container respectively, the device on the container being located beneath its floor and within the outside boundary of the container and above the bottom plane of the container floor supports.

14. The combination, with a vehicle having a frame, of a container adapted to rest on said frame and having side sills and a floor which leaves a space beneath it between the sills, into which space portions of the vehicle may project, and cooperative positioning devices carried by the vehicle and container, those on the container being located in the space beneath the floor and between the side sills.

In testimony whereof, I hereunto affix my signature.

BENJAMIN F. FITCH.